United States Patent [19]

Dorschner et al.

[11] Patent Number: 5,093,740
[45] Date of Patent: Mar. 3, 1992

[54] OPTICAL BEAM STEERER HAVING SUBAPERTURE ADDRESSING

[75] Inventors: Terry A. Dorschner, Newton Centre; Daniel P. Resler, Wilmington, both of Mass.

[73] Assignee: Raytheon Company, Lexington, Mass.

[21] Appl. No.: 662,094

[22] Filed: Feb. 28, 1991

[51] Int. Cl.⁵ .............................................. G02F 1/133
[52] U.S. Cl. ........................................ 359/88; 359/79; 359/94
[58] Field of Search ............... 350/347 V, 336, 339 R, 350/331 R

[56] References Cited

U.S. PATENT DOCUMENTS

| | | | |
|---|---|---|---|
| 3,791,716 | 2/1974 | Borel et al. | 350/347 V |
| 3,915,548 | 10/1975 | Opittek et al. | 350/334 |
| 4,066,334 | 1/1978 | Fray et al. | 350/347 V |
| 4,639,091 | 1/1987 | Huignard et al. | 350/347 V |
| 4,824,215 | 4/1989 | Joseph et al. | 350/336 |
| 4,882,235 | 11/1989 | Resler | 428/642 |
| 4,958,914 | 9/1990 | Owechko et al. | 350/347 V |
| 4,964,701 | 10/1990 | Dorschner et al. | 350/336 |
| 5,018,835 | 5/1991 | Dorschner | 350/347 V |

OTHER PUBLICATIONS

"Radar Handbook," M. I. Skolnik, ed., McGraw-Hill, New York, 1970, Chapter 11.

Primary Examiner—Stanley D. Miller
Assistant Examiner—Anita Pellman Gross
Attorney, Agent, or Firm—Christopher L. Maginniss; Richard M. Sharkansky

[57] ABSTRACT

A practical means for electrically addressing the extremely large number and high density of phase shifters needed for operation of an optical phased-array beam steerer. The array of phase shifters is divided into identical subarrays which completely fill an optical aperture. All subarrays are connected electrically in parallel by electrically interconnecting corresponding electrodes of each subarray. Thus, the number of external electrical leads required for addressing the full array is reduced to the number of phase shifters in a signle subarray.

11 Claims, 4 Drawing Sheets

OPTICAL BEAM STEERER HAVING SUBAPERTURE ADDRESSING

The Government has rights in this invention pursuant to Contract No. F33615-87-C-1507, awarded by the Department of the Air Force.

BACKGROUND OF THE INVENTION

This invention relates generally to optical beam steering and, more particularly, to electrically programmable apparatus for providing high performance, agile, optical beam steering of large aperture beams wherein the number of electrical connections required is manageable with current technology.

A static deflector for deflecting a polarized infrared beam is suggested by U.S. Pat. No. 4,639,091, issued Jan. 27, 1987, to J.-P. Huignard et al. The Huignard et al. deflector comprises a layered square plate having as a front layer a window on which stripe electrodes are disposed. Both the window and the stripe electrodes are transparent to an incident infrared beam. A middle layer of the deflector comprises an electro-optical liquid crystal layer. The bottom layer comprises a substrate having a common electrode adjacent the liquid crystal layer. The common electrode is preferably reflective at the beam wavelength, illustratively it is a gold film; alternatively, for a deflector operating by transmission, a transparent rear plate may be used.

Huignard et al. suggest a periodic staircase waveform comprising N voltage steps which are applied to the stripe electrodes, thereby creating local variations of the refractive index in the liquid crystal layer in such a manner as to form a diffraction grating of adjustable period.

Practical applications of the striped-electrode, liquid crystal cell optical beam deflector concept are disclosed in U.S. Pat. No. 4,964,701, "Deflector for an Optical Beam," issued Oct. 23, 1990, to Terry A. Dorschner et al., which patent is incorporated herein by reference, and U.S. Pat. application Ser. No. 292,789, "Deflector for an Optical Beam Using Refractive Means," filed Jan. 3, 1989, for Terry A. Dorschner. These, as well as other applications of optical beam steering, underscore the need for rapid, large-angle pointing and scanning of optical beams, in particular, large diameter, diffraction limited carbon dioxide ($CO_2$) laser radar beams. In short, there exists a pressing need for an optical version of the versatile phased array antennas now widely used for microwave radar systems.

An optical phased array "antenna" for electronic steering of optical beams is difficult to realize in practice because of the very large number of phase shifters and the corresponding very high density of electrical connections required for operation of an optical array. High performance, large-angle beam steering requires that the individual phase shifters of the array have spacings less than the wavelength of the light to be steered. Spacings of one-half to one wavelength are usually chosen for microwave phased array antennas, and it is anticipated that comparable spacings will be used in optical systems.

Fabrication of liquid crystal optical phase shifters of this dimension is quite feasible using semiconductor photolithography. At the present time, devices with electrode widths of less than two microns are being readily fabricated. Additionally, sub-micron spacings are feasible with state-of-the-art lithography means. However, connecting each of the phase shifters of a large array to independent voltage supplies appears to be monumental task.

Considering the more-or-less optimal case of one-half wave spacings, if all of the phase shifters of a linear, one-dimensional array were to be independently addressable, the edge connection density would be 2000 per centimeter (cm) of aperture at ten microns wavelength, and 20,000 per cm at one micron wavelength. Since apertures up to one meter are desired, the number of electrical connections required for a conventionally-operated phased array architecture may be one million, or even larger for visible wavelengths. A second one-dimensional unit to cover a second dimension of steering would require an equal number of connections. Numbers of off-chip interconnects of this magnitude are considered to be vastly excessive, especially considering that current practice is to use no more than a few hundred off-chip connects in conventional semiconductor technology.

Optical phased array systems are also known in which the phase shifters and spacings are larger than a wavelength, with consequential performance degradation. The resultant reduction of phase shifters obviously reduces the required number of electrode connections. Nevertheless, this approach is considered unacceptable for many applications since spacings larger than one wavelength generally give rise to multiple output beams for a single input beam. Where the application of the present invention is in a laser radar system, it is generally essential that there be only one beam. The presence of multiple beams may be tolerable for some transmitting functions; the power into the intended beam is merely reduced, albeit by a large factor. However, in the receive mode, simultaneous sensitivity to energy from multiple directions can give rise to an unacceptable ambiguity in the target direction.

SUMMARY OF THE INVENTION

It is therefore a primary object of the present invention to provide an improved optical beam steerer.

It is a further object of this invention to provide an optical beam steerer which is an improvement over the prior art in that it includes a large multiplicity of stripe electrodes, thereby providing rapid, large-angle deflection of large diameter laser radar beams.

It is a still further object of this invention to provide a practical and realizable means for coupling individual control voltages to such a large multiplicity of stripe electrodes.

These and other objects of this invention are obtained generally by providing an apparatus for deflecting an optical beam. The apparatus comprises an array of optical phase shifters having a common electrode on a first surface thereof, a multiplicity of S parallel stripe electrodes on a second surface thereof, and an electro-optic phase shifting medium intermediate the first and second surfaces. The apparatus additionally comprises M interconnects, each interconnect being coupled to S/M of the stripe electrodes, wherein the ith interconnect is coupled to each of the (i+jM)th stripe electrodes for all integer values of j from 0 to (S/M)−1. The apparatus further comprises means for coupling M control signals individually between the M interconnects and the common electrode, thereby creating local variations of refractive index in the phase shifting medium.

With this arrangement, the array of phase shifters is divided into identical subarrays which completely fill an optical aperture. The subarrays are interconnected electrically in parallel by connecting corresponding electrodes of each subarray. Thus, the number of external electrical leads required for addressing the full array is reduced to the number of phase shifters in a single subarray.

BRIEF DESCRIPTION OF THE DRAWINGS

The foregoing features of the present invention, and the advantages thereof, may be fully understood from the following detailed description, read in conjunction with the accompanying drawings, wherein.

DESCRIPTION OF THE PREFERRED EMBODIMENTS

The phase shifting elements of the present invention illustratively comprise liquid crystal devices and may generally be of the type suggested in the above-mentioned Huignard et al. patent, but which are more specifically similar to the phase shifting elements disclosed and described in the Dorschner et al. (701') patent.

Figure 1:
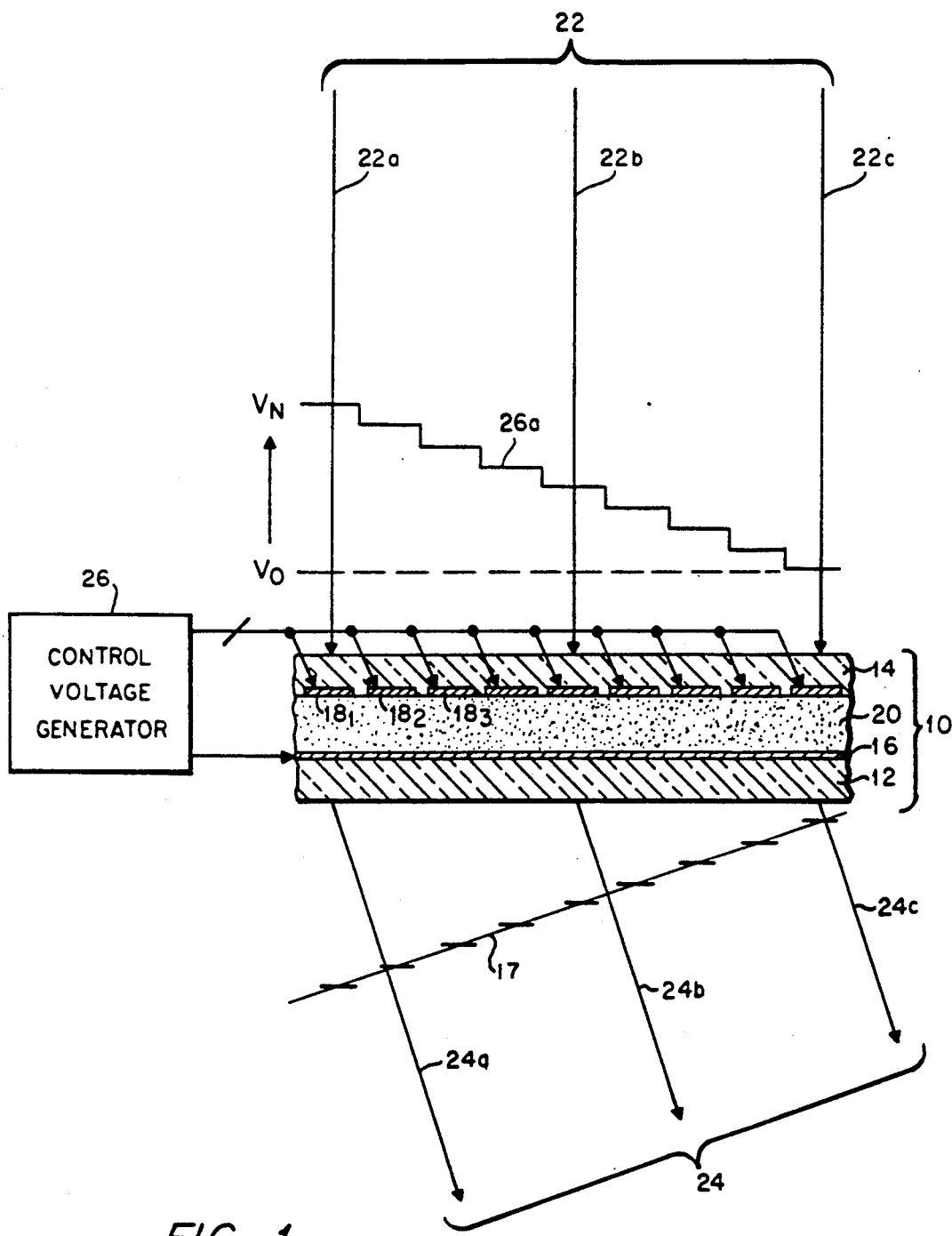
FIG. 1 is a diagrammatical cross-sectional view of a liquid crystal beam deflector.

Referring to FIG. 1, there is shown, in diagrammatical cross-sectional view, a liquid crystal beam steering device 10 of the type described for use in the present invention, and which is a simplified representation of the beam steerer described in the Dorschner et al. (701') patent. Device 10 comprises a liquid crystal cell having windows 12 and 14 which are optically transparent at the frequency range of interest Common electrode 16, affixed to window 12, is electrically conductive and optically transparent. Electrodes $18_1$, $18_2$, $18_3$, ..., referred to collectively as electrodes 18, affixed to window 14, comprise a plurality of electrically-conductive, optically-transparent stripes. Illustratively, for steering of carbon dioxide laser beams, electrodes 18 may be 4–10 micrometers ($\mu$m) in width, and spaced from one another by approximately one $\mu$m. The space between windows 12 and 14 is filled with a layer of liquid crystal molecules 20, illustratively long, thin, rod-like organic molecules of the so-called "nematic" phase.

The referenced Dorschner et al. patent teaches the use of alignment layers on the inner surfaces of windows 12 and 14 to properly align the liquid crystal molecules at the boundaries of layer 20. The appropriate alignment of the liquid crystal molecules, such that liquid crystal cell 10 functions properly as a variable phase retarder, is parallel to the polarization of the incident light. It has also been determined that a preferable alignment of the liquid crystal molecules is orthogonal to the longitudinal edges of the stripe electrodes 18. For the balance of this disclosure, this preferable alignment will be assumed, with the result that a beam having linear polarization aligned orthogonal to the longitudinal edges of stripe electrodes 18 will be deflected in response to control voltages applied thereon, while a beam having linear polarization parallel to the longitudinal edges of stripe electrodes 18 will pass through liquid crystal cell 10 undeflected.

The optical beam phase shifter 10 of FIG. 1 is responsive to a light source and beam forming network (not shown) which provide a polarized light beam 22, ranging from visible through far infrared. In this example, beam 22 is in the infrared spectrum, having a typical wavelength in the range of 9 to 11.5 $\mu$m, illustratively at 10.6 $\mu$m. Light beam 22, represented in part by rays 22a–22c, is directed onto window 14 of optical device 10. Light beam 22 may be incident perpendicular to the plane formed by stripe electrodes 18, or it may be incident obliquely, preferably such that its projection onto the plane formed by stripe electrodes 18 is parallel to the longitudinal direction of electrodes 18. In other words, the longitudinal edges of stripe electrodes 18 are parallel to the planes of incidence of rays 22a–22c.

It is characteristic of liquid crystal molecules whose orientation is well-defined by alignment layers as described above, that the application of an electric field perpendicular to the alignment layer affects the speed of light whose polarization is parallel to the alignment layers propagated therethrough, and hence, the retardance. Thus, in the simplified example of FIG. 1, the application of different potentials between common electrode 16 and the individual stripe electrodes $18_1$, $18_2$, $18_3$, ..., from control voltage generator 26 results in differential electric fields in the regions between the individual stripe electrodes 18 and common electrode 16, thereby creating local variations of the refractive index in the liquid crystal layer 20. For ease of understanding, a limited number of stripe electrodes 18 are shown in FIG. 1, whereas, in the actual phase shifter embodying the present invention, there may be many thousands of such stripes.

In the present simplified example, the potentials applied to the electrodes 18 onto which rays 22a, 22b and 22c are incident, shown diagrammatically as staircase waveform 26a, are such as to cause the greatest retardation to emergent ray 24c, and the least retardation to emergent ray 24a. Thus, the wavefront 17 of the beam 24 which emerges from the optical beam deflector 10 is tilted with respect to the incident wavefront. If identical potential is applied to all electrodes 18, the refractive index of the liquid crystal layer 20 is uniform, and beam 24 is undeflected. It is therefore seen that the optical beam deflector 10 of FIG. 1 provides selective beam steering in accordance with the electrical potentials applied to stripe electrodes 18.

The application of control voltage signals to the individual stripe electrodes 18 for the purpose of beam steering is analogous to the methods used in conventional microwave radar beam steering as taught, for example, in *Radar Handbook*, M.I Skolnik, ed., McGraw-Hill, New York, 1970, at chapter 11. As shown by illustrative waveform 26a, a plurality of control voltage signals, being periodic in space and having a continuous progression of voltage steps within each period between a minimum value and a maximum value, may be applied to the multiplicity of stripe electrodes 18. However, it is not intended to limit the present invention only to pluralities of control voltage signals which are periodic.

In the present example, in which the optical beam incident on deflector 10 is illustratively provided from a $CO_2$ laser, cell windows 12 and 14 must exhibit low absorption of the infrared light having the wavelength emitted by a $CO_2$ laser, typically at 10.6 $\mu$m. Typical candidates for the choice of cell windows 12 and 14 include semiconductors such as germanium, zinc selenide and gallium arsenide, or the halide salts, such as potassium chloride, all of which are relatively transparent to $CO_2$ laser light. In addition, electrode 16, which provides electrical conductivity across cell window 12, and electrodes 18, which provide a multiplicity of individual zones of electrical conductivity on cell window 14, must also be substantially optically transparent at the above-mentioned wavelength.

In the present example, optically transparent electrodes 16 and 18 are preferably provided on cell windows 12 and 14 by a process of ion implantation, as disclosed in U.S. Pat. No. 4,882,235, "Liquid Crystal Cell Windows" issued Nov. 21, 1989, to D. P. Resler, and assigned to the same assignee as the present invention, which patent is incorporated herein by reference.

Whereas the illustrative beam steering device 10 of FIG. 1 operates in the transmission mode for light beam 22 incident on window 14 having stripe electrodes 18, the cited references suggest that many variations of this arrangement may be effected. As a first example of such variations, light beam 22 may be incident on window 12 having common electrode 16 and emerge deflected from window 14. As a second example, common electrode 16 may be reflective at the frequency range of interest, and light beam 22 would be incident on, and emerge deflected from window 14. As a third example, stripe electrodes 18 may be optically reflective, and light beam 22 would be incident on, and emerge deflected from, window 12. (In this latter example, the narrow spacings between the stripes 18 may be minimized in order to minimize any extraneous grating patterns which otherwise might exist). In another example, common electrode 16 and/or stripe electrodes 18 may be formed on the outside of their respective windows 12, 14, away from the liquid crystal layer 20. Finally, an additional optically-reflective layer (not shown) may be added to device 10 against either window 12 or 14 to operate device in the reflection mode. It is intended that these, as well as other known and obvious variants, are to be included within the scope of the invention to be described herein.

Operation of the beam steerer is as follows: A staircase of voltage 26a is applied to electrodes 18, the voltage levels chosen to result in a uniform staircase, or an approximation to a ramp, of phase shift across the aperture. Because the response of the liquid crystal is not linear, the voltage ramp does not necessarily comprise equal steps. The phase shifters may be operated modulo $2\pi$, as with microwave arrays, to avoid the requirement of large phase shifts. The resultant "sawtooth" distribution of phase is equivalent to a single continuous phase ramp, which acts like a prism and steers the input beam according to the degree of phase ramp imposed.

Considering now the means for providing control voltages individually to the stripe electrodes 18, the referenced Dorschner et al. ('701) patent discloses relatively large contact pads which underlie the stripe electrodes, and whose widths span a number of the stripes. Each contact pad is electrically coupled to a single electrode by a conductor which may typically be deposited into a via hole. The conductors are preferably spaced apart in a staggered configuration.

Although the '701 patent discloses means for coupling control voltages to a number of closely-spaced stripe electrodes, there still exists no practical and realizable method in the current state of the art to affix individual leads to each of a great multiplicity of such electrodes. The present invention discloses structure for combining the multiplicity of electrodes into a plurality of subarrays, wherein each subarray comprises a number of electrodes sufficient to provide an adequate distribution of beam steering angles for the intended application.

Figure 2A:
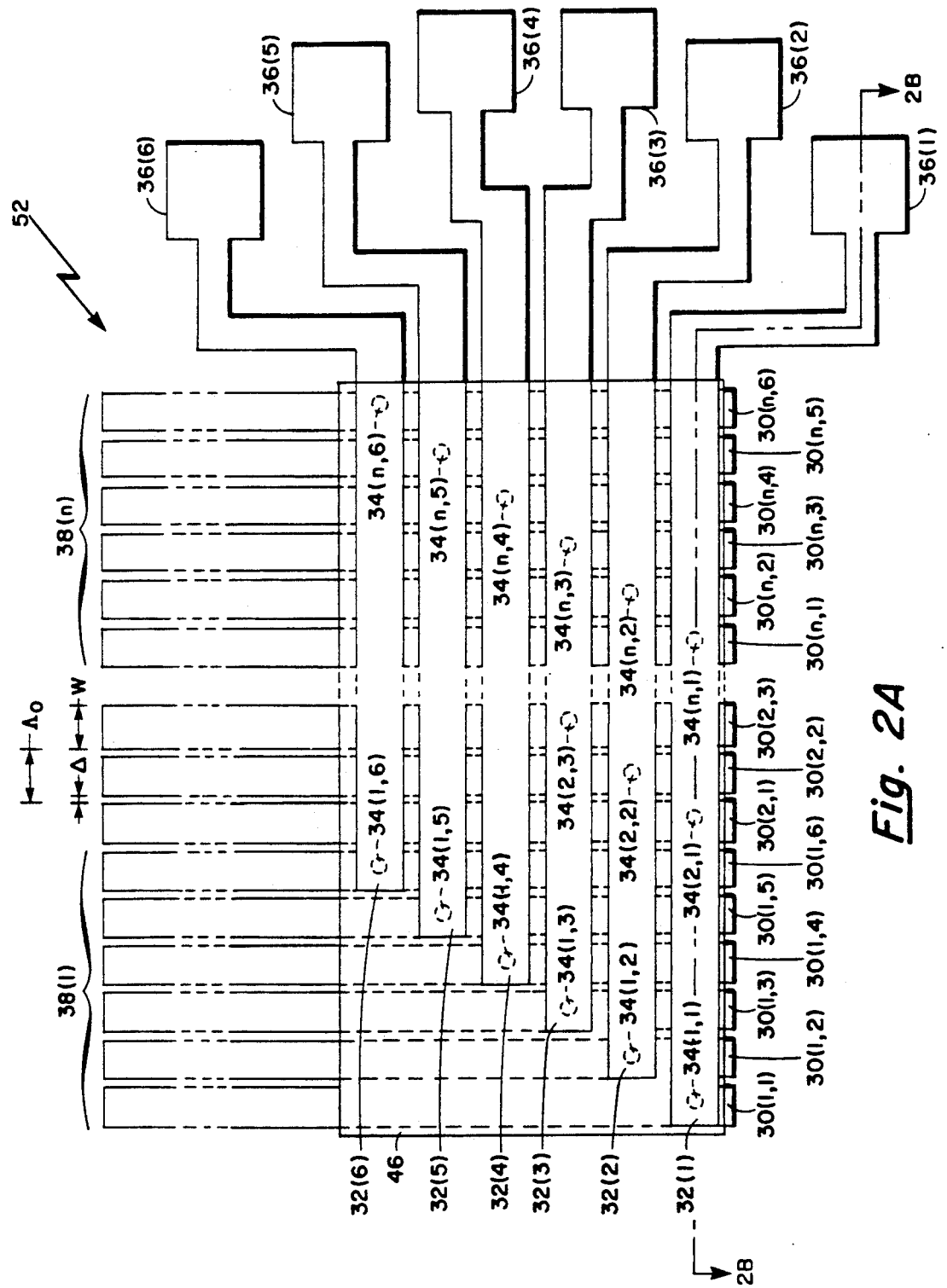
FIG. 2a is a plan view and FIG. 2b is a cross-sectional view of a simplified embodiment of a subaperture-addressed optical steerer according to the present invention.
Figure 2B:
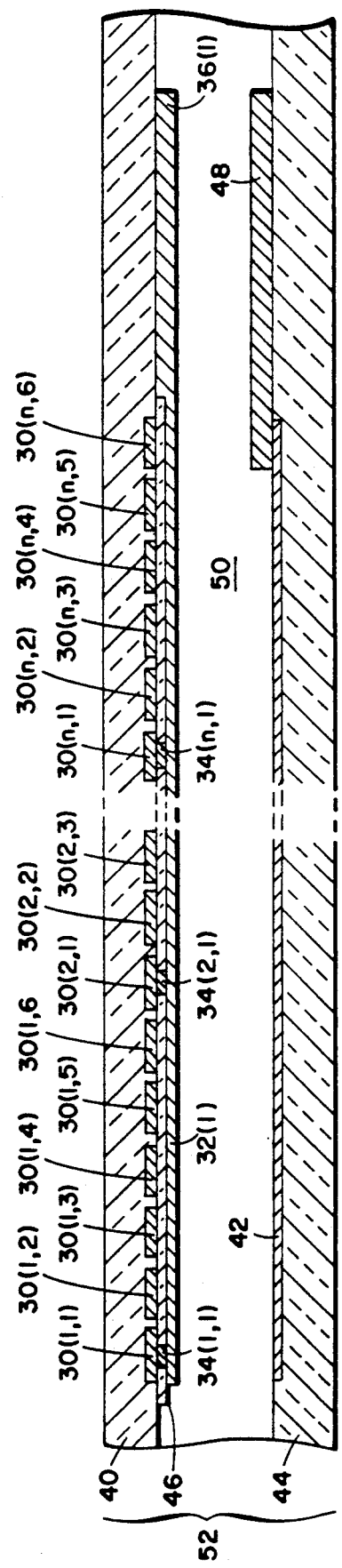

Referring now to FIGS. 2a and 2b, there are shown diagrammatical plan and cross-sectional views, respectively, of a portion of a simplified beam steering assembly according to the principles of the present invention. The assembly includes a liquid crystal cell 52 having windows 40 and 44 and a layer of liquid crystal molecules 50 therebetween. As in the beam steering device 10 of FIG. 1, cell 52 includes a common electrode 42 on an inner surface of window 44, and a multiplicity of stripe electrodes 30(1,1), 30(1,2), ..., 30(1,6), 30(2,1), ..., 30(2,6), ..., 30(n,1), ..., 30(n,6), referred to collectively as stripe electrodes 30, on an inner surface of window 40.

It is therefore seen that the beam steering assembly of FIGS. 2a and 2b comprises a large array of striped phase shifters, wherein each phase shifter is formed by one of the stripe electrodes 30, the common electrode 42 and the liquid crystal molecules 50 therebetween. The phase shifters have a lateral dimension $\Lambda_0 = w + \Delta$, where w is the width of the stripe electrode 30, and $\Delta$ is the gap between stripe electrodes 30. The phase shifters uniformly cover substantially the entire aperture of the beam steering assembly.

In accordance with the principles of the present invention, a plurality of n subarrays 38(1), ..., 38(n), referred to collectively as subarrays 38, are formed by jumper straps 32(1), 32(2), ..., 32(6), referred to collectively as jumper straps 32. For ease of illustration, a subarray size of six phase shifters is depicted. Jumper strap 32(1) interconnects stripe electrodes 30(1,1), 30(2,1), ..., and 30(n,1); jumper strap 32(2) interconnects stripe electrodes 30(1,2), 30(2,2), ..., and 30(n,2); etc. Jumper strap 32(1) is connected to stripe electrode 30(1,1) by a conductor within via hole 34(1,1), to stripe electrode 30(2,1) by a conductor within via hole 34(2,1), ..., and to stripe electrode 30(n,1) by a conductor within via hole 34(n,1). In general, it may be said that jumper straps 32(i) are connected to stripe electrodes 30(j,i) by the conductors within via holes 34(j,i), wherein j runs from 1 to the number of subarrays, n, and i runs from 1 to the number of phase shifters, M, within each subarray. Each jumper strap 32(i) terminates at a contact pad 36(i) for interconnection with external wiring for the purpose of application of control voltages thereto. Similarly, common electrode 42 is coupled to a contact pad 48 for interconnection with an external lead for the purpose of application of a reference voltage thereto.

In the example depicted in FIGS. 2a and 2b, every sixth electrode 30 is connected in parallel, and there are just six address lines which must be connected via contact pads 36 to external power supplies, instead of the thousands which would ordinarily be required for apertures of one cm or larger. There is also a single ground connection required at contact pad 48, independent of the number of electrodes 30 in a subarray 38, or in the entire array.

Although the illustratively six phase shifters of each subarray 38 are independently addressable, each phase shifter is permanently connected in parallel to the corresponding phase shifter of each of the other subarrays 38. Thus, whatever spatial phase distribution is applied to one subarray 38 is repeated across the full aperture.

In general, if M is the number of phase shifters in a subarray, the number of addressing electrodes is M+1. For practical applications, M is likely to be a rather large number, probably several hundred, possibly several thousand. However, as long as M is small in comparison with the total number of phase shifters S in the entire array, there is a significant reduction of the number of required addressing lines. That is the case for practical applications.

In practice the leadout connections are fabricated as follows: a multiplicity of stripe electrodes 30 (one for each phase shifter) are formed on an optically transparent substrate 40 by ion implantation. Other means may be used, such as deposition of semi-transparent conducting thin films, but ion implantation has been found to be preferable from several key performance considerations, such as losses, optical index match, and laser damage levels. A thin-film insulating layer 46, such as silicon nitride or silicon dioxide, is then deposited over a small area including the terminating ends of electrodes 30. Via holes 34 are then formed in the thin-film insulating layer 46 using a photopattern and either plasma or chemical etching. The via holes 34 are arranged in a pattern appropriate for the desired electrode grouping; i.e., at every Mth electrode in a cyclic manner for an M-phase-shifter subarray architecture, as shown in FIGS. 2a and 2b. Thin-film metal interconnect lines 32 are then deposited through another photo-pattern on top of insulating layer 46, thereby electrically connecting the appropriate electrodes 30 through via holes 34. As many metal interconnect lines 32 are used as there are independently addressable connections for the subarray architecture chosen. The metal interconnect lines 32 terminate at the substrate periphery into bonding pads 36 which may illustratively be subsequently wire-bonded to pins on a flatpack device holder (not shown).

Although the beam steering device illustrated in the present embodiment comprises a liquid crystal cell 52 having planar windows 40 and 44, it will be recognized by those of skill in the art that electrodes 40 and 42 may be affixed to non-planar surfaces, e.g., convex or concave surfaces, which have the quality of being of good optical figure.

The subarray-addressed optical beam steerer of the present invention may be operated similarly to a conventional phased array, that is, a step-wise approximation to a phase ramp across the beam steering aperture is formed by the application of a corresponding staircase profile of voltages to the electrodes (see FIG. 1). As with conventional phased arrays, the phase ramps may be applied modulo $2\pi$ with maximum amplitude $2\pi$. In the present invention, however, only a limited number of ramp periods can be synthesized because only a limited number of phase shifters, namely M, the number in each subarray, are independently addressable. This limits the number of addressable beam positions; however, a rather large number of positions are nevertheless possible, even for moderate subarray sizes, as is discussed below.

Ramps with periods $N\Lambda_0$ which are integral factors of the subarray period $M\Lambda_0$ can be applied without any discontinuities at the subarray edges. That is an important consideration for maintaining low levels of sidelobes. Ramps comprised of N phase steps, with N given by ±6, ±3, ±2, and infinity, can be illustratively formed with the subarrays 38 of FIGS. 2a and 2b. Each of these ramp periods corresponds to an addressable beam position given by $\Theta = \sin^{-1}(\lambda/N\Lambda_0)$, where $\lambda$ is the freespace wavelength of the optical beam.

For the case of half-wave spacing, i.e., $\lambda = 2\Lambda_0$, the set of angles obtainable is ±19.47°, ±41.81°, ±90°, and 0°, respectively. These are large steering angles, which is a consequence of the subarray being very small. The 90° case is actually not of practical interest since very little energy would actually be steered in that direction; the effective radiating area of the device reduces to zero.

Figure 3:
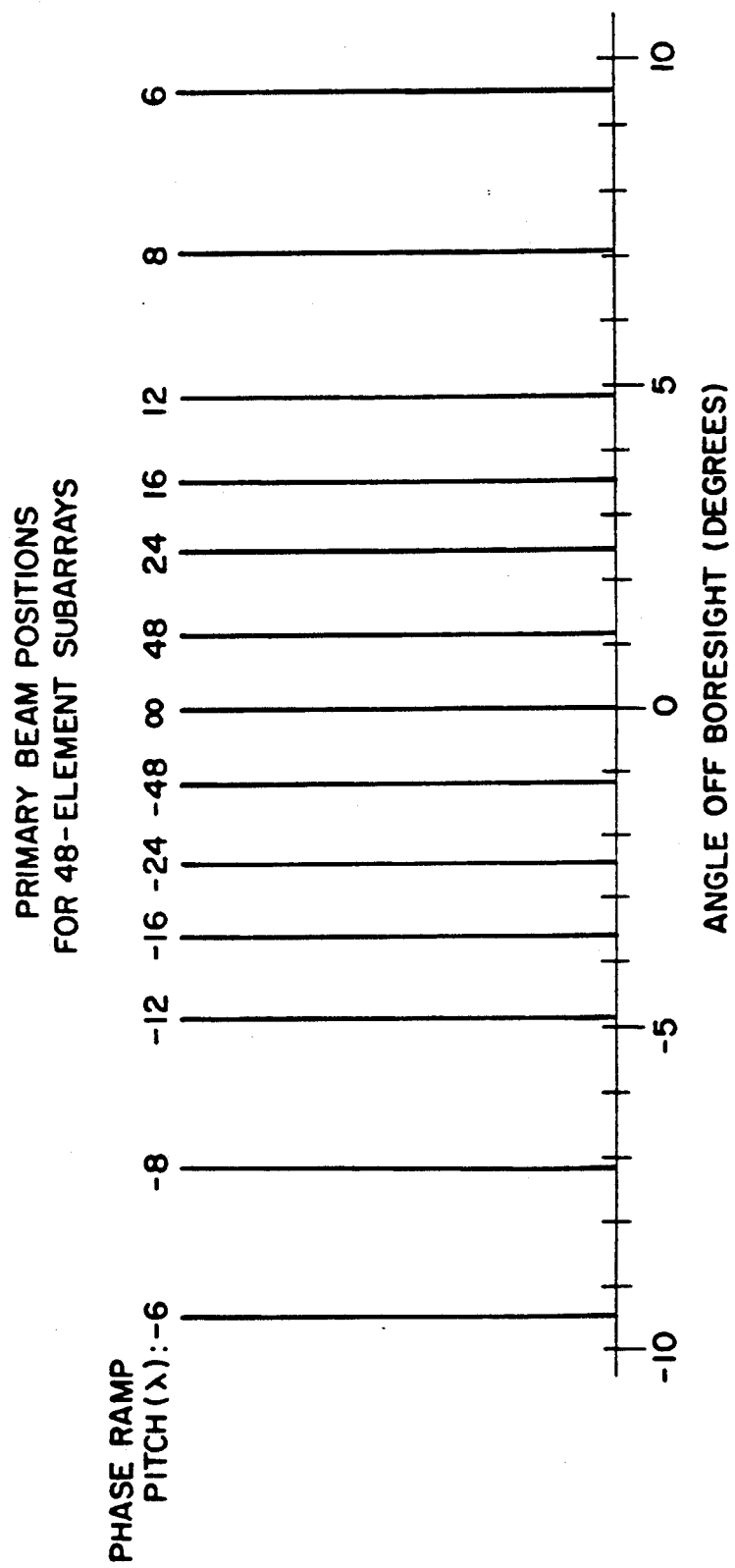
FIG. 3 is a depiction of steering angle vs. phase ramp pitch for an optical beam steerer having 48-element subarrays.

In general, subarrays with larger numbers of phase shifters include smaller steering angles. As an example, subarrays of 48 phase shifters give the distribution of steering angles shown in FIG. 3, for the case of exact factorial periods (labeled "ramp pitch" here). A spacing $\Lambda_0$ of one wavelength between the stripe electrodes of the phase shifters has been assumed. Only those angles subtending a ±10° field of regard are shown; that is a fairly typical range of interest. It may be seen from FIG. 3 that the distribution of obtainable angles is fairly uniform. This trend toward uniform angle spacing increases rapidly as the number of elements in the subarray increases. A beam steerer having subarrays of 256 phase shifters has been built and tested and found to provide a large number of beam positions, fairly uniformly distributed within the above-mentioned ±10° field of regard.

Other driving techniques enable additional beam directions to be addressed. As one example, additional periods can be formed by the linear superposition of the above exact periods. Other effective periods can also be formed by the combination of periods which sum to the subarray dimension.

Methods of providing such additional effective periods are disclosed in greater detail in a copending United States patent application, "Method for Providing Beam Steering in a Subaperture-Addressed Optical Beam Steerer," filed for Terry A. Dorschner on the same day as the present application, and assigned to the assignee of the present invention. It is intended to incorporate by reference the teachings of the above-cited patent application into the present application.

While the principles of the present invention have been demonstrated with particular regard to the illustrated structure of the figures, it will be recognized that various departures from such illustrative structure may be undertaken in the practice of the invention. The scope of this invention is not intended to be limited to the structure disclosed herein but should instead be gauged by the breadth of the claims which follow.

What is claimed is:

1. Apparatus for deflecting an incident optical beam, said apparatus comprising:

an array of optical phase shifters having a common electrode on a first surface thereof, a multiplicity of S parallel stripe electrodes on a second surface thereof, and an electro-optic phase shifting medium intermediate said first and second surfaces;

M interconnects, each interconnect being coupled to S/M of said stripe electrodes, wherein the ith interconnect is coupled to each of the (i+jM)th stripe electrodes for all integer values of j from 0 to (S/M)−1; and means for coupling M control signals individually between said M interconnects and said common electrode, thereby creating local variations of refractive index in said phase shifting medium.

2. The apparatus according to claim 1 wherein said common electrode is substantially transparent to light having wavelength of said optical beam.

3. The apparatus according to claim 1 wherein said multiplicity of stripe electrodes are substantially transparent to light having wavelength of said optical beam.

4. The apparatus according to claim 1 wherein said electro-optic phase shifting medium comprises a layer of liquid crystal molecules.

5. The apparatus according to claim 1 wherein said stripe electrodes are fabricated on said second surface by ion implantation.

6. The apparatus according to claim 1 further including an insulating layer covering a portion of all of said stripe electrodes, and wherein said M interconnects overlie said insulating layer, said M interconnects being electrically coupled to said stripe electrode by electrically conductive material within apertures in said insulating layer.

7. Apparatus for deflecting an incident optical beam, said apparatus comprising:
a liquid crystal cell element including a first window having a common electrode, a second window having a multiplicity of S parallel stripe electrodes, and a layer of liquid crystal molecules intermediate said first and second windows;

M interconnects, each interconnect being coupled to S/M of said stripe electrodes, wherein the ith interconnect is coupled to each of the $(i+jM)$th stripe electrodes for all integer values of j from 0 to $(S/M)-1$; and means for coupling M control signals individually between said M interconnects and said common electrode, thereby creating local variations of refractive index in said liquid crystal layer.

8. The apparatus according to claim 6 wherein said common electrode is substantially transparent to light having wavelength of said optical beam.

9. The apparatus according to claim 6 wherein said multiplicity of stripe electrodes are substantially transparent to light having wavelength of said optical beam.

10. The apparatus according to claim 6 wherein said stripe electrodes are fabricated on said second window by ion implantation.

11. The apparatus according to claim 7 further including an insulating layer covering a portion of all of said stripe electrodes, and wherein said M interconnects overlie said insulating layer, said M interconnects being electrically coupled to said stripe electrode by electrically conductive material within apertures in said insulating layer.

* * * * *